United States Patent
Lee et al.

(10) Patent No.: US 9,903,404 B2
(45) Date of Patent: Feb. 27, 2018

(54) GENERAL-PURPOSE TAPPING SCREW CAPABLE OF BEING COUPLED TO VARIOUS OBJECTS AND COUPLING METHOD USING SAME

(71) Applicant: ASIA BOLT CO., LTD, Incheon (KR)

(72) Inventors: Young-Hee Lee, Incheon (KR); Chang-Young Kim, Incheon (KR); Sang-You Lee, Incheon (KR)

(73) Assignee: ASIA BOLT CO., LTD, Incheon (KR)

( * ) Notice: Subject to any disclaimer, the term of this patent is extended or adjusted under 35 U.S.C. 154(b) by 304 days.

(21) Appl. No.: 14/432,717

(22) PCT Filed: Oct. 9, 2012

(86) PCT No.: PCT/KR2012/008168
§ 371 (c)(1),
(2) Date: Mar. 31, 2015

(87) PCT Pub. No.: WO2014/054827
PCT Pub. Date: Apr. 10, 2014

(65) Prior Publication Data
US 2015/0252834 A1    Sep. 10, 2015

(30) Foreign Application Priority Data
Oct. 2, 2012   (KR) ........................ 10-2012-0109597

(51) Int. Cl.
*F16B 25/00*    (2006.01)
(52) U.S. Cl.
CPC ...... *F16B 25/0042* (2013.01); *F16B 25/0031* (2013.01); *F16B 25/0047* (2013.01);
(Continued)

(58) Field of Classification Search
CPC .............. F16B 25/0031; F16B 25/0042; F16B 25/0047; F16B 25/0068; Y10T 19/49963; Y10T 19/49885
See application file for complete search history.

(56) References Cited

U.S. PATENT DOCUMENTS 3,355,205 A * 11/1967 Wagner ............... F16B 25/0031
                                                              29/458
3,861,269 A *  1/1975 Laverty .............. F16B 25/0031
                                                              411/413
(Continued)

FOREIGN PATENT DOCUMENTS

DE      19848717 A1    4/2000
GB       2242494 A    10/1991
(Continued)

OTHER PUBLICATIONS

European Extended Search Report corresponding to Application No. 12885942.8-1760 dated Sep. 28, 2015.
(Continued)

*Primary Examiner* — Christopher M Koehler
(74) *Attorney, Agent, or Firm* — Hauptman Ham, LLP

(57) ABSTRACT

The present invention provides a general use tapping screw, which is a two-line screw having a cylindrical body, and main threads and auxiliary threads which are formed on the outer circumferential surface of the body, wherein the outer diameter of the auxiliary threads is 92~97% the outer diameter of the main threads, the angle of the front flank surfaces of the main threads and the auxiliary threads is in the range of 12±3 degrees, the angle of the rear flank surfaces of the main threads is in the range of 25±3 degrees, the angle of the rear flank surfaces of the auxiliary threads is in the range of 20±3 degrees, and intervals between a first pitch from the main thread to the auxiliary thread and a
(Continued)

second pitch from the auxiliary thread to the next main threads have a difference in the range of ±10-20%.

5 Claims, 9 Drawing Sheets

(52) U.S. Cl.
CPC ..... *F16B 25/0068* (2013.01); *Y10T 29/49885* (2015.01); *Y10T 29/49963* (2015.01)

(56) References Cited

U.S. PATENT DOCUMENTS

| | | | | |
|---|---|---|---|---|
| 4,439,077 A | * | 3/1984 | Godsted | F16B 25/0047 411/411 |
| 6,296,433 B1 | * | 10/2001 | Forsell | F16B 25/00 411/386 |
| 6,623,228 B1 | * | 9/2003 | Hettich | F16B 25/00 411/387.4 |
| 2004/0184897 A1 | | 9/2004 | Levey et al. | |
| 2007/0269287 A1 | * | 11/2007 | Runge | F16B 25/00 411/378 |
| 2009/0022568 A1 | * | 1/2009 | Becker | F16B 25/00 411/386 |
| 2013/0336744 A1 | * | 12/2013 | Phua | F16B 25/0026 411/387.1 |

FOREIGN PATENT DOCUMENTS

| | | |
|---|---|---|
| JP | 1994330928 A | 11/1994 |
| JP | 2004340369 A | 12/2004 |
| JP | 2007292193 A | 11/2007 |
| JP | 2007292201 A | 11/2007 |
| JP | 2010216638 A | 9/2010 |

OTHER PUBLICATIONS

International Search Report for PCT/KR2012/008168 dated Dec. 12, 2012.

* cited by examiner

GENERAL-PURPOSE TAPPING SCREW CAPABLE OF BEING COUPLED TO VARIOUS OBJECTS AND COUPLING METHOD USING SAME

CROSS REFERENCE TO RELATED APPLICATION

This application claims the priority of Korean Patent Application No. 10-2012-0109597 filed on Oct. 2, 2012 in the Korean Patent and Trademark Office. Further, this application is the National Phase application of International Application No. PCT/KR2012/008168 filed on Oct. 9, 2012, which is incorporated herein by reference in its entirety.

TECHNICAL FIELD

The present invention relates to a tapping screw configured to tap a female thread as it is driven, and more particularly, to a general-purpose tapping screw capable of being commonly used for injection-molded objects, soft metals and hard metals.

BACKGROUND ART

Conventional tapping screws are generally classified by basic materials to which screws are coupled for tapping, i.e. materials of objects. In other words, conventional tapping screws cannot be commonly used if materials of objects (injection molded materials (hereinafter, injection-molded objects) such as synthetic resins and the like, light alloy materials such as Al or the like, and steel materials such as thin SECC or the like) are different.

In general, since injection-molded objects, such as synthetic resins and the like, are softer than steel materials, a tapping screw suitable for injection-molded objects typically has a large pitch and a conical shape which ends in a point at the bottom of a thread body, in order to minimize deformation of the injection-molded objects. Since engagement intervals of threads are large in a tapping process due to the large pitch, deformation of the injection-molded objects is minimized and reuse is permitted. Forming the thread body in a conical shape also provides the above-mentioned advantages. Application to an extremely short coupling structure can be hard due to a large pitch (generally, recommended in a structure in which a coupling depth is more than double the length of a screw), lifespan of a mold for screws can be reduced by forming a circle-shaped raw material into a cone-shaped screw, and loss can be caused by preparing different types of molds for different products.

Further, a tapping screw suitable for coupling to soft or hard metallic objects has a smaller pitch than a tapping screw for injection-molded objects. In general, the soft or hard metallic object is formed with a larger hole than the injection-molded objects so as to achieve tapping by applying a certain force (assembly torque value) to threads. A suitable hole determines suitable assembly torque. Since application of the tapping operation to soft or hard metallic objects is relatively difficult due to harder properties thereof than injection-molded objects such as synthetic resins and the like, if a hole is formed similar to that of the injection-molded objects, a torque value is considerably increased and thus an optimal assembly torque value cannot be obtained. Accordingly, a suitable size hole, which is larger than that of the injection-molded objects, decreases thread engagement and results in reduction of torque in a tapping process. However, since decrease in thread engagement can cause unexpected release due to external shock such as vibration or the like, the tapping screw has a smaller pitch and more threads than that for injection-molded objects in order to compensate for this problem. Further, in many cases, tapping screws for soft or hard metallic objects are coupled to short coupling structures, e.g., ultra-thin structures of electronic products, and thus the pitch is smaller than that of the tapping screws for injection-molded objects such as synthetic resins and the like.

As such, the largest difference between the tapping screws for injection-molded objects and the tapping screws for soft or hard metallic objects is the distance of the pitch. If the tapping screws for soft or hard metallic objects are coupled to injection-molded objects such as synthetic resins or the like, the injection-molded objects can be excessively deformed or damaged due to a small pitch, and if the tapping screws for injection-molded objects are coupled to soft or hard metallic objects, the objects can be damaged by lack in the number of engagement threads due to a large pitch.

Due to the aforementioned problems occurring upon application of the tapping operation to different materials, screws cannot be commonly used for various objects made of different materials.

Accordingly, such classification of the screws leads to separate classification of injection-molded object assembly lines and steel product assembly lines, thereby causing various losses.

DISCLOSURE

Technical Problem

It is an aspect of the present invention to provide a tapping screw capable of being commonly used regardless of a material of an object.

It is another aspect of the present invention to provide a tapping screw capable of being reused as well as being commonly used regardless of a material of an object.

Technical Solution

In accordance with one aspect of the present invention, a general-purpose tapping screw includes: a two-line screw structure having a cylindrical body, and main threads and auxiliary threads formed on an outer circumferential surface of the body, in which an outer diameter of the auxiliary threads is 92% to 97% of an outer diameter of the main threads.

An angle of front flank surfaces of the main threads and the auxiliary threads may be in the range of 12±3 degrees, and an angle of rear flank surfaces of the auxiliary threads may be smaller than an angle of rear flank surfaces of the main threads.

The angle of the rear flank surfaces of the main threads may be in the range of 25±3 degrees, and the angle of the rear flank surfaces of the auxiliary threads may be in the range of 20±3 degrees.

A first pitch P1 from the main thread to the auxiliary thread may be larger than a second pitch P2 from the auxiliary thread to the next main thread by 10~20%.

In accordance with another aspect of the present invention, a coupling method using a general-purpose tapping screw including a two-line screw structure having a cylindrical body, and main threads and auxiliary threads formed on an outer circumferential surface of the body, in which an outer diameter of the auxiliary threads is 92% to 97% of an outer diameter of the main threads, an angle of front flank surfaces of the main threads and the auxiliary threads is in the range of 12±3 degrees, an angle of rear flank surfaces of the main threads is in the range of 25±3 degrees, an angle of rear flank surfaces of the auxiliary threads is in the range of 20±3 degrees, and a first pitch P1 from the main thread to the auxiliary thread and a second pitch P2 from the auxiliary thread to the next main thread have a difference of ±10~20%, includes forming a coupling hole in the range of 75~85% of an outer diameter of the main threads in an object made of an injection-molded synthetic resin, and coupling the general-purpose tapping screw to the coupling hole.

For an object made of a soft or hard metal, the coupling method includes forming a coupling hole in the range of 85~95% of an outer diameter of the main threads in the object, and coupling the general-purpose tapping screw to the coupling hole.

The coupling method may further include coating a lubricant on a surface of the general-purpose tapping screw before coupling the general-purpose tapping screw.

Advantageous Effects

With the general-purpose tapping screw according to the present invention, manufacturers can achieve simplification of 4M management and intermediate consumers can maximize utilization of assembly space and enjoy improved productivity (reduction in moving time due to space integration and increase in screw coupling speed due to the two-line structure of the screw) to intermediate consumers. Accordingly, process loss can be reduced in each process and this is a win-win for both manufacturers and intermediate consumers in that cost reduction can be anticipated.

Further, end consumers can use high-quality and low-priced products. Furthermore, the screws for common use can also facilitate after-sales service.

DESCRIPTION OF DRAWINGS

FIG. 1 is a view showing a general tapping screw configured to be coupled to injection-molded objects such as synthetic resins and the like.

BRIEF DESCRIPTION OF REFERENCE NUMERALS

Figure 1:
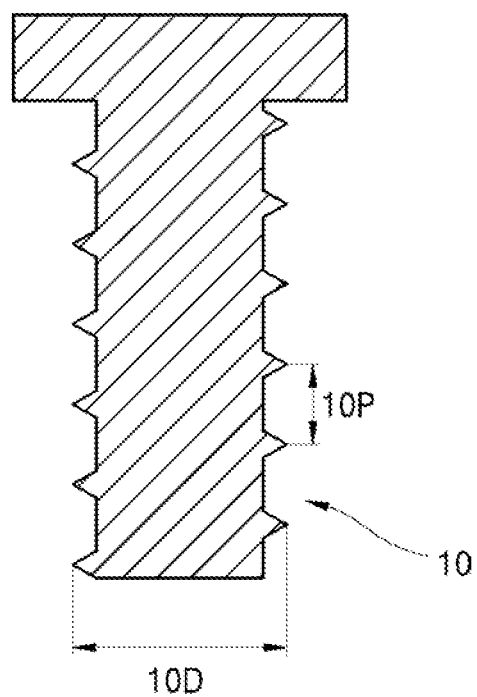

10: Tapping screw for injection-molded objects such as synthetic resins and the like 20: Tapping screw for soft or hard metals
100: General-purpose tapping screw
120: Head portion
140: Thread portion
142: Body
144: Main thread
146: Auxiliary thread

BEST MODE

Hereinafter, exemplary embodiments of a general-purpose tapping screw capable of being coupled to various objects and a coupling method using the same according to the present invention will be described.

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof. In the following description, a detailed description of known functions and configurations incorporated herein will be omitted when it may make the subject matter of the present invention rather unclear.

Figure 2:
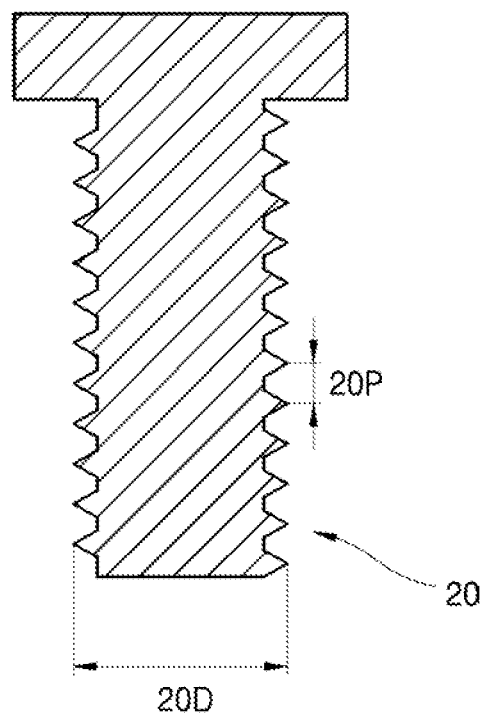
FIG. 2 is a view showing a general tapping screw configured to be coupled to soft or hard metals.

FIG. 1 is a view showing a general tapping screw configured to be coupled to injection-molded objects such as synthetic resins and the like, and FIG. 2 is a view showing a general tapping screw configured to be coupled to soft or hard metals.

In general, a tapping screw 10 for injection-molded objects such as synthetic resins and the like and a tapping screw 20 for soft or hard metals (e.g., carbon steel) are separately used.

The largest difference between the tapping screw 10 for injection-molded objects such as synthetic resins and the like and the tapping screw 20 for soft or hard metals is a pitch 10 P or 20 P. The tapping screw 10 for injection-molded objects such as synthetic resins and the like has a relatively large pitch 10 P in order to prevent deformation or damage of the injection-molded objects, and the tapping screw 20 for soft or hard metals has a relatively small pitch 20 P and a relatively large number of engagement threads in order to secure high engagement force because the tapping screw 20 can be smoothly coupled to soft or hard metallic objects when thread engagement with the objects is low.

However, if the tapping screw 20 for soft or hard metals is coupled to injection-molded objects such as synthetic resins and the like, the injection-molded objects can be deformed or damaged, and if the tapping screw 10 for injection-molded objects such as synthetic resins and the like is coupled to soft or hard metals, the engagement force may be reduced or the objects may be damaged by lack in the number of engagement threads due to the large pitch.

As such, due to the above problems occurring when applying the tapping operation to different materials, screws cannot be commonly used for various objects made of different materials.

Figure 3:
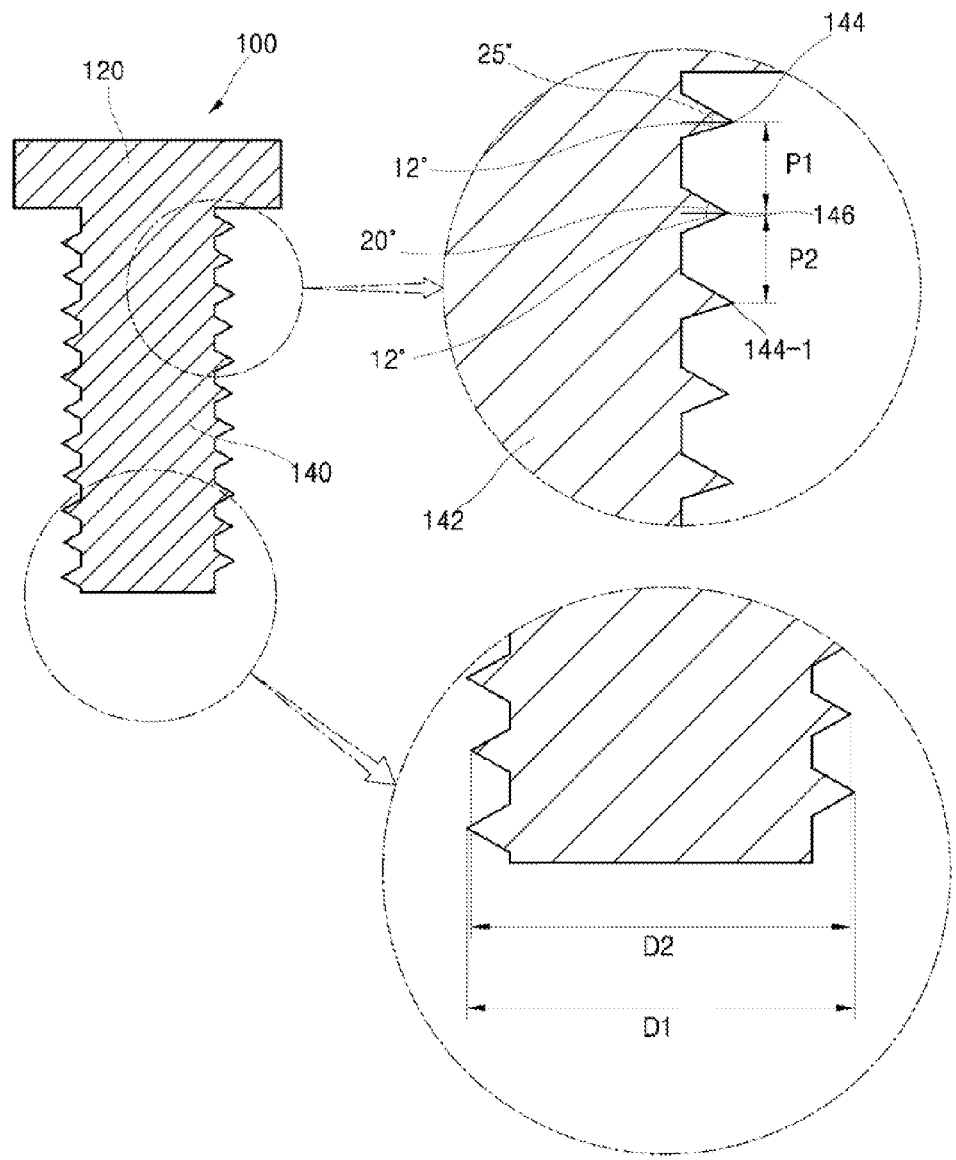
FIG. 3 is a view showing a general-purpose tapping screw according to an embodiment of the present invention.

FIG. 3 is a view showing a general-purpose tapping screw according to an embodiment of the present invention.

A general-purpose tapping screw 100 according to the present invention includes a head portion 120 and a thread portion 140, and the thread portion 140 is configured as a two-line screw having a cylindrical body 142, and main threads 144 and auxiliary threads 146 formed on the outer circumferential surface of the body 142.

The purpose of the present invention is to prevent damage to objects and to permit reuse when applying the tapping operation to injection-molded objects such as synthetic resins and the like or soft or hard metallic objects, and the tapping screw of the present invention can be used regardless of materials of objects by making the main threads 144 and the auxiliary threads 146 different, and can be reused.

Preferably, an outer diameter D2 of the auxiliary threads 146 is 92% to 97% of an outer diameter D1 of the main threads 144.

Further, an angle of front flank surfaces (slanted surfaces configured to contact an object in coupling a screw) of the main threads 144 and the auxiliary threads 146 is in the range of 12±3 degrees, and rear flank surfaces (slanted surfaces opposite the front flank surfaces) have different angles.

Preferably, the angle of the rear flank surfaces of the main threads 144 is in the range of 25±3 degrees, and the angle of the rear flank surfaces of the auxiliary threads 146 is in the range of 20±3 degrees.

Preferably, a first pitch P1 from the main thread 144 to the auxiliary thread 146 and a second pitch P2 from the auxiliary thread 146 to the next main thread 144-1 have a difference of ±10-20%.

Preferably, the second pitch P2 has a similar value to a standard pitch of a tapping screw for soft or hard metals, the first pitch P1 and the second pitch P2 are formed to have a difference of ±10~20%, and the sum P1+P2 of the two pitches has a similar value to a standard pitch of a tapping screw for injection-molded objects.

By forming such three kinds of pitches, i.e., the first pitch P1, the second pitch P2 and the sum P1+P2 of the first and second pitches, the tapping screw according to the present invention can achieve sufficient engagement force and reusability corresponding to the material of each object.

For injection-molded objects such as synthetic resins and the like, a coupling hole into which the tapping screw is coupled is formed in the range of 75% to 85% of the outer diameter of the tapping screw, and for soft or hard metallic (e.g., aluminum or carbon steel) objects, a coupling hole into which the tapping screw is coupled is formed in the range of 85% to 95% of the outer diameter of the tapping screw.

Thus, according to the present invention, the diameter D2 of the auxiliary threads 146 is set to be in the range of 92% to 97% of the diameter of the main threads 144.

Further, so as to facilitate tapping operation in coupling, the angle of the front flank surfaces of the main threads 144 and the auxiliary threads 146 is set to be in the range of 12±3 degrees. Here, 3 degrees are set in consideration of tolerance.

The angle of the rear flank surfaces of the main threads 144 is in the range of 25±3 degrees and the angle of the rear flank surfaces of the auxiliary threads 146 is in the range of 20±3 degrees so as to make the threads sharp, thereby reducing deformation of the object during the tapping operation while facilitating the tapping operation.

The general-purpose tapping screw 100 according to the present invention has the following effects when coupled to soft or hard metallic objects and injection-molded objects.

For injection-molded objects (or soft or hard metallic objects), the main threads 144 provide primary engagement force like a conventional tapping screw for injection-molded objects, and the auxiliary threads 146, which are less engaged with the object than the main threads, have an engagement structure capable of minimizing deformation of the object, in spite of a smaller pitch than that of the conventional tapping screw for injection-molded objects, by virtue of the first pitch P1 and the second pitch P2 and a smaller thread angle (angle between the front flank surface and the rear flank surface) than that of the main threads 144.

Since the two-line screw structure has features such that a coupling speed is relatively high under the same coupling conditions, the injection-molded objects such as synthetic resins and the like can be reduced in deformation due to heat, and thus reuse can be achieved and assembly productivity can be enhanced by improvement of an assembly speed. Further, since the body has a cylindrical shape, productivity can be enhanced and the screw can be more evenly coupled than a cone-shaped tapping screw, which facilitates stable tapping.

For soft or hard metallic objects, since the interval P1+P2 between the main threads 144 is relatively large, the screw undergoes less coupling load than a conventional tapping screw for soft or hard metallic objects, and abrasion of the threads is also reduced. At this time, the main threads 144 provide primary engagement force. The thread engagement is reduced since the interval P1+P2 between the main threads 144 providing the primary engagement force is relatively large, however, thread engagement can be substantially equal or increased, since engagement force of the auxiliary threads 146 compensates for the reduced main thread engagement.

Hereinafter, a coupling method using the above general-purpose tapping screw according to the present invention will be described.

In order to suitably couple the tapping screw to an object, a coupling hole is first formed in the object, into which the tapping screw will be coupled.

The present invention secures sufficient engagement force and reusability by making the diameter of the coupling hole different according to the material of the object when coupling the general-purpose tapping screw to the object.

When the material of the object is an injection-molded synthetic resin, it is desirable that the inner diameter of the coupling hole be set in the range of 75~85% of the outer diameter D1 of the main threads.

If the inner diameter of the coupling hole formed in the object is less than 75%, it is difficult to secure sufficient engagement force, and if the inner diameter of the coupling hole formed in the object is greater than 85%, it is difficult to secure reusability due to damage to the object.

Further, when the material of the object is a hard metal such as carbon steel, it is desirable that the inner diameter of the coupling hole formed in the object be set in the range of 85~95% of the outer diameter D1 of the main threads.

When the inner diameter of the coupling hole is less than 85%, an excessive engagement torque is needed to secure sufficient engagement force, and thus the object can be damaged and reusability cannot be obtained. On the contrary, when the inner diameter of the coupling hole is greater than 95%, the object can be easily damaged and reusability cannot be obtained. Further, a lubricant may be coated on the screw for smooth engagement. The lubricant reduces frictional force between the screw and the object, thereby allowing smooth engagement while reducing deformation of the object due to heat.

Figure 4:
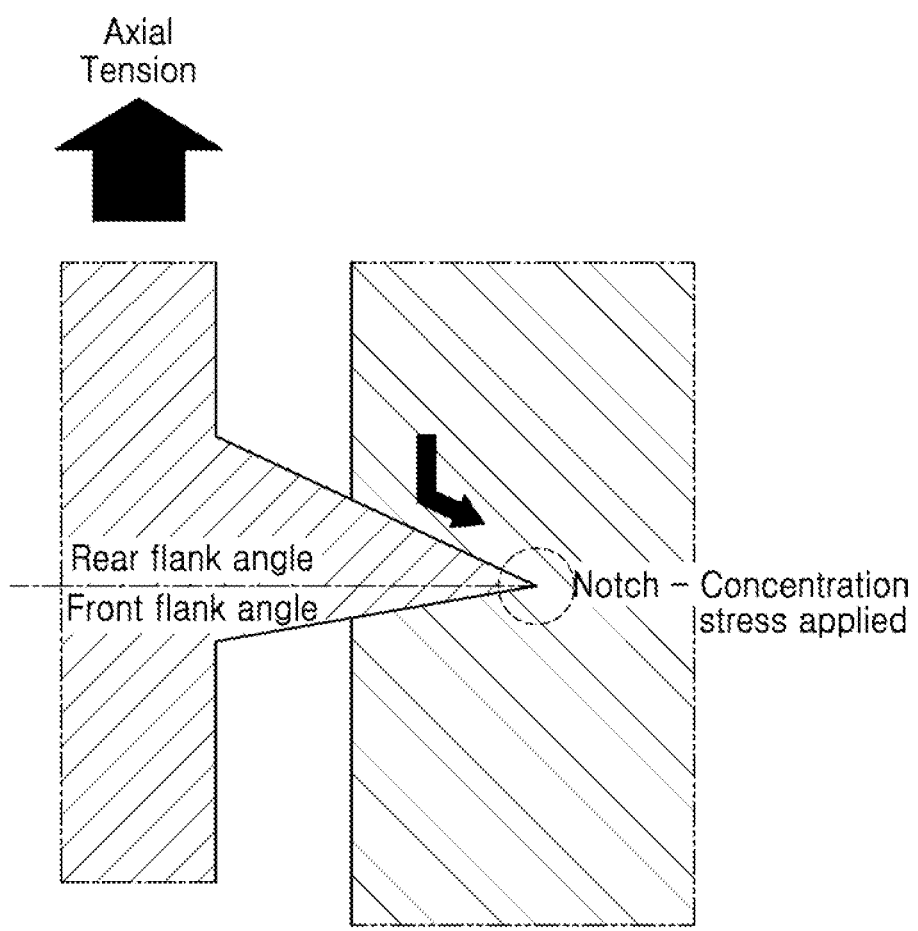
FIG. 4 is a view explaining a physical meaning of a front flank angle and a rear flank angle of threads.

FIG. 4 is a view explaining a physical meaning of the front flank angle and the rear flank angle of the threads.

The sum of the front flank angle and the rear flank angle becomes a thread angle, and a sharper (smaller) thread angle is more advantageous in order to allow the threads to penetrate the object. However, if the thread angle is too small, the threads cannot endure tensile force in an axial direction of the screw and can be worn, or can be damaged while penetrating the object.

A larger rear flank angle is more advantageous. When tensile force is applied to the screw in the axial direction after the threads penetrate the object, a peak portion (sharp tip) of the threads is embedded most deeply in the object, and such a portion acts as a notch and becomes a deformation start point of the object. Therefore, increase in the thread angle by setting the rear flank angle to be large prevents the peak portion from acting as a notch, thereby diminishing concentration of stress and allowing the object to move in a relatively gentle angle toward the front of the screw so as to prevent damage to the object. However, if the rear flank angle is too large and thus the thread angle is relatively large, excessive force is required when penetrating the object.

For these reasons, according to the present invention, the rear flank angle of the main threads is set to be 25±3 degrees and the rear flank angle of the auxiliary threads is set to be 20±3 degrees.

As the front flank angle is decreased, the thread angle is decreased and thus the screw can easily penetrate the object. However, in this case, the front flank angle is set to be 12±3 degrees in order to easily achieve a general thread rolling process.

When the thread angle corresponding to the sum of the rear flank angle and the front flank angle is about 37 degrees, the screw has stable engagement performance even when coupled to a hard metallic object such as steel.

Figure 5:
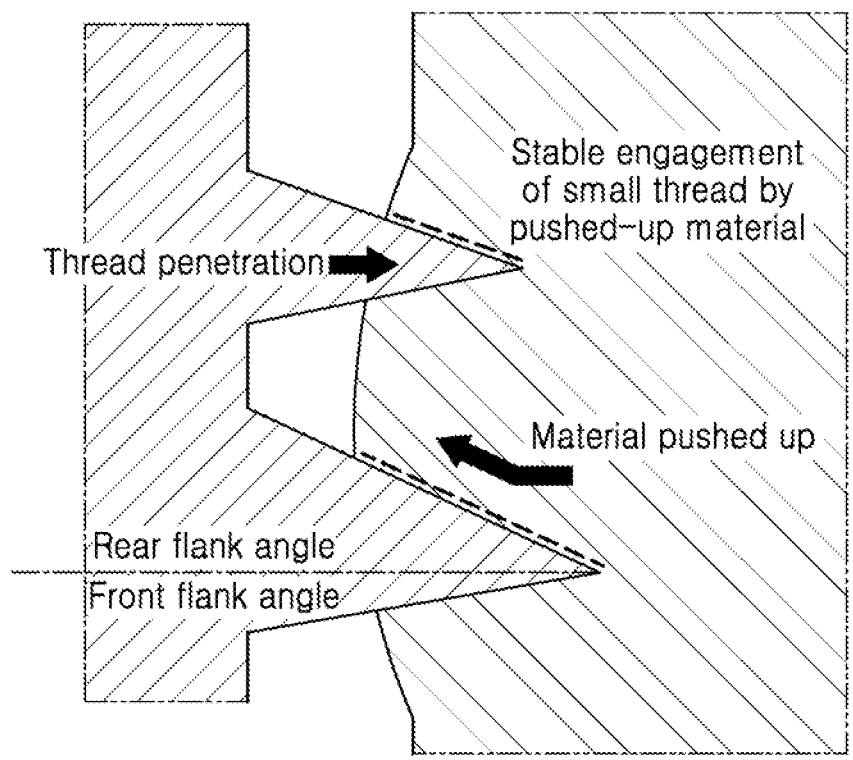
FIG. 5 is a view explaining a physical meaning of outer diameters of main threads and auxiliary threads.

FIG. 5 is a view explaining a physical meaning of the outer diameters of the main threads and the auxiliary threads.

When the main threads penetrate an object, a material of the object is pushed back as much as a penetration volume. Further, since the rear flank angle of the main threads is larger than the rear flank angle of the auxiliary threads, a greater amount of material of the object is pushed back toward the auxiliary threads. Therefore, though the height (outer diameter) of the auxiliary threads is smaller than the height of the main threads, the coupling operation can be achieved with stable thread engagement.

The reason that the height of the auxiliary threads is smaller than that of the main threads is to reduce deformation of the material of the object when the auxiliary threads penetrate the object, thereby completing the coupling operation with a relatively small force.

Figure 6:
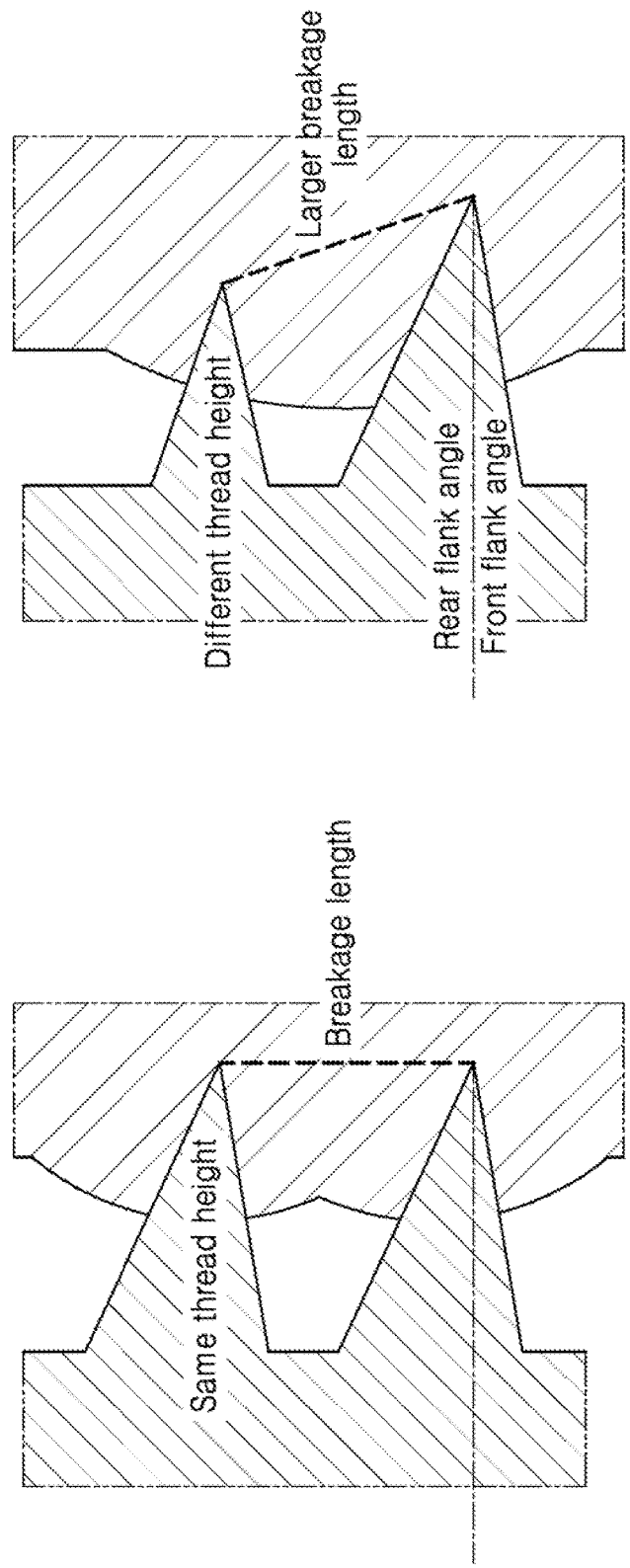
FIG. 6 is a view showing a breakage length of a material of an object according to a difference between outer diameters of main threads and auxiliary threads.
Figure 7:
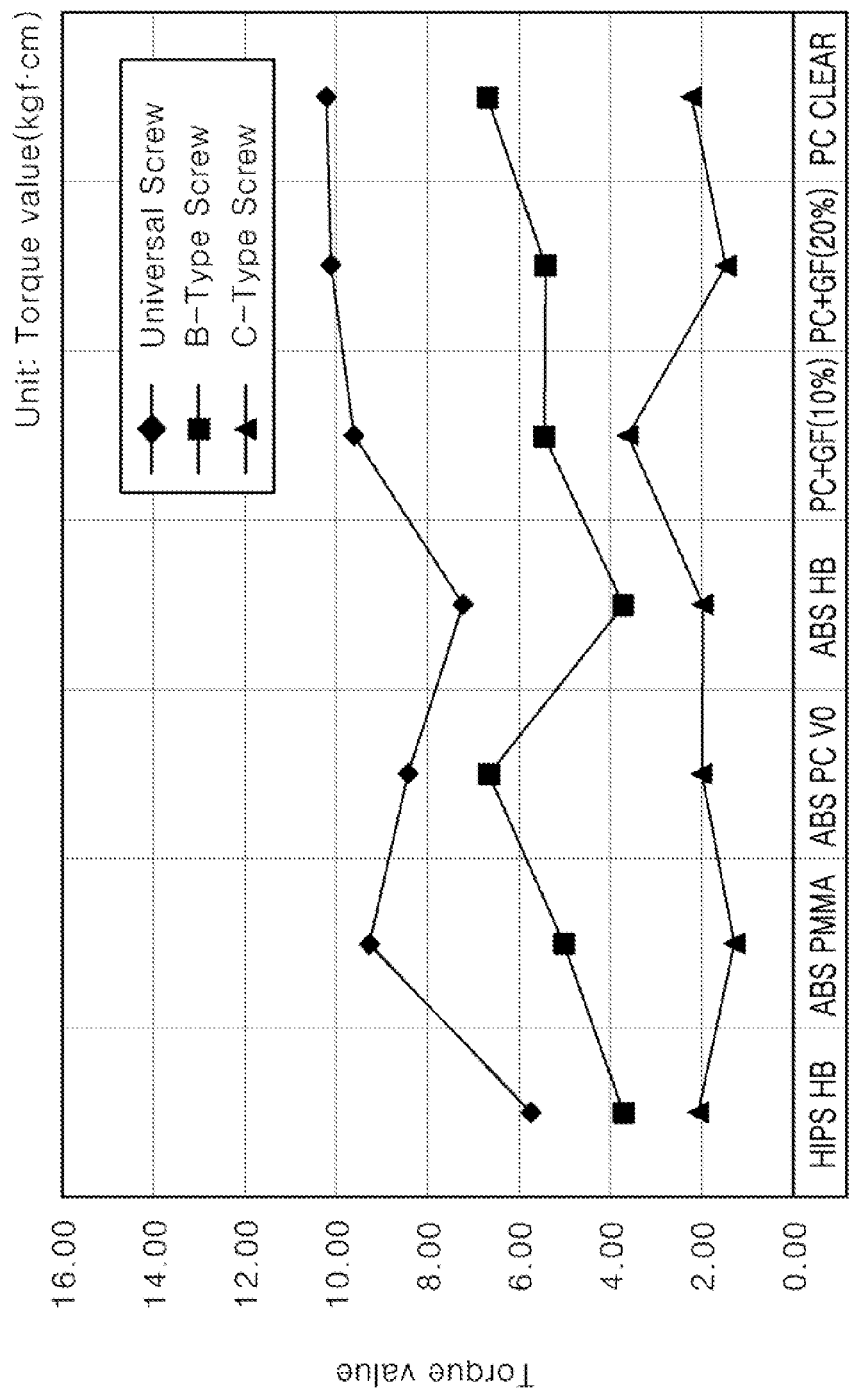
FIG. 7 is a graph showing results of measuring a difference between Ts and Ti according to injection-molded materials, such as synthetic resins and the like, and screw shapes.

FIG. 6 is a view showing a breakage length of a material of an object according to a difference between outer diameters of the main threads and the auxiliary threads.

If excessive tensile force is applied in the axial direction in the screw having a uniform thread height, breakage begins from the peak portion of the threads due to concentration of stress and extends to the peak portion of the adjacent thread located in the direction of pulling the screw.

On the other hand, in the case of the screw having different thread heights between the main threads and the auxiliary threads, as in the present invention, the main threads push the material of the object in the perpendicular direction to the rear flank surfaces. At this time, because the peak portion of the auxiliary threads is located inward of the main threads in the axial direction of the screw, a breakage length becomes longer and thus resistance to breakage is improved.

Hereinafter, embodiments of the general-purpose tapping screw according to the present invention will be described in detail through test results.

Elements for evaluating performance of the tapping screw may include an installation torque (hereinafter, Ti) and a stripping torque (hereinafter, Ts).

Ti refers to a torque value when a head of a screw contacts an object, and Ts refers to a torque value when a screw idles due to damage to an object caused by increase in torque. Therefore, an assembly torque is determined between Ti and Ts. If a difference between Ti and Ts is relatively large, an assembly torque value can be determined within a relatively large range which can have a great influence on assembly stability.

Figure 8:
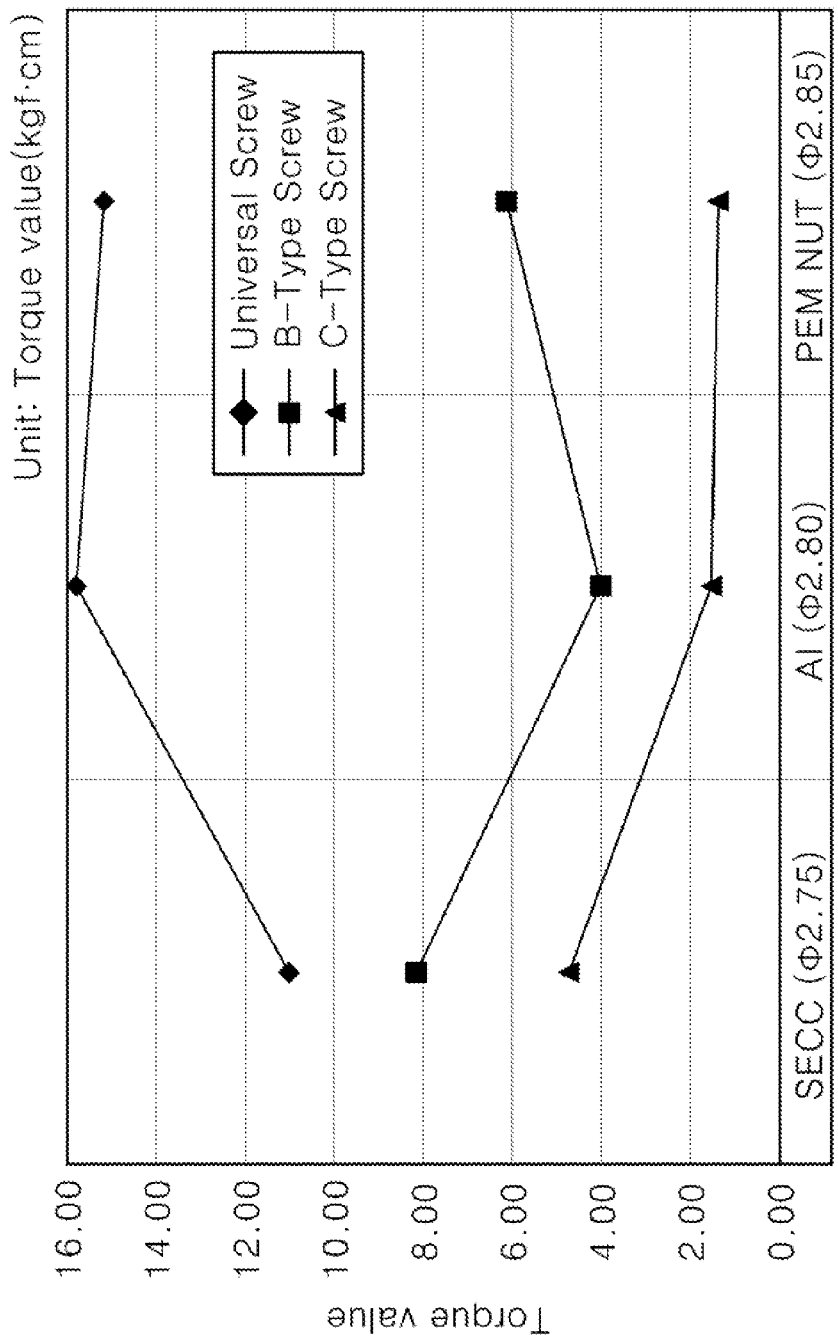
FIG. 8 is a graph showing results of measuring a difference between Ts and Ti according to metallic materials and screw shapes.

FIG. 8 is a graph showing results of measuring a difference (Ts−Ti) between Ts and Ti according to injection-molded materials, such as synthetic resins and the like, and screw shapes.

As materials of the object, HIPS HB, ABS PMMA, ABS PC V0, ABS HB, PC+GF (10%), PC+GF (20%), and PC-Clear may be used.

Comparing differences between Ts and Ti, it can be seen that a graph of the general-purpose tapping screw (universal screw) (indicated by ♦) according to the present invention is located above a graph of a conventional B-type screw (indicated by ■) and a graph of a conventional C-type screw (indicated by ▲). This means that the difference between the stripping torque (Ts) and the installation torque (Ti) is relatively large. As a result, since the assembly torque range is relatively large, the present invention is evaluated to have the most stable engagement range and good usability.

An average outer diameter of all three screws is 3.0 mm, and the B-type screw having a minor diameter of 2.15 mm and a thread height of 0.38 mm and the C-type screw having a minor diameter of 2.22 mm and a thread height of 0.31 mm are used.

When the assembly torque range is relatively small, the screw cannot be sufficiently fastened at an actual assembly torque less than the installation torque Ti. On the contrary, if an actual assembly torque is greater than the stripping torque Ts, the product can be damaged.

FIG. 8 is a graph showing results of measuring a difference between Ts and Ti according to metallic materials and screw shapes.

As metallic materials of the object, SECC, Al, and Pem nut may be used.

It can be known from the results that a graph of the difference between Ts and Ti of the general-purpose tapping screw according to the present invention is located above graphs of the other screws and the general-purpose tapping screw (universal screw) (indicated by ♦) has more stable engagement range than a conventional B-type screw (indicated by ■) and C-type screw (indicated by ▲).

Figure 9:
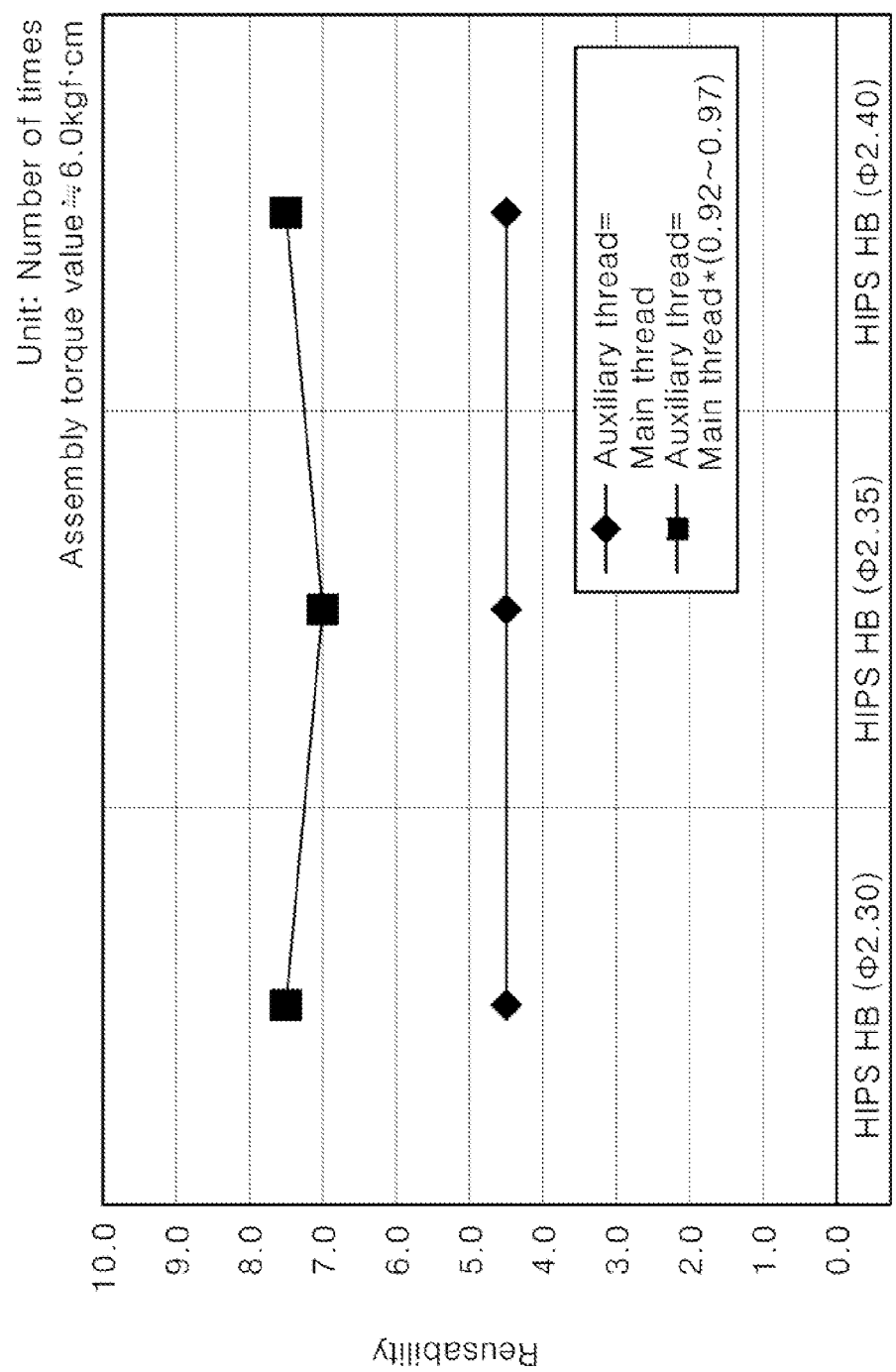
FIG. 9 is a graph showing reusability according to a height of auxiliary threads.

FIG. 9 is a graph showing reusability according to a height of the auxiliary threads.

As shown, it can be seen that reusability when the height of the auxiliary threads is 92% to 97% that of the main threads (indicated by ■) is higher than when the height of the auxiliary threads is equal to that of the main threads (indicated by ♦).

As described above, the general-purpose tapping screw according to the present invention provides superior engagement force and has reusability regardless of materials of objects.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

INDUSTRIAL APPLICABILITY

With the general-purpose tapping screw according to the present invention, manufacturers can achieve simplification of 4M management and intermediate consumers can maximize utilization of assembly space and enjoy improved productivity (reduction in moving time due to space integration and increase in screw coupling speed due to the two-line structure of the screw). Accordingly, process loss can be reduced in each process and this is a win-win for both manufacturers and intermediate consumers in that cost reduction can be anticipated.

The invention claimed is:

1. A general-purpose tapping screw comprising:
   a two-line screw structure including a cylindrical body and main threads and auxiliary threads formed on an outer circumferential surface of the body,
   wherein an outer diameter of the auxiliary threads is 92% to 97% an outer diameter of the main threads,
   wherein a first pitch from the main thread to the auxiliary thread and a second pitch from the auxiliary thread to the next main thread have a difference of ±10~20%,
   wherein an angle of front flank surfaces of the main threads and the auxiliary threads is in the range of 12±3 degrees, and
   wherein the angle of the rear flank surfaces of the main threads is in the range of 25±3 degrees, and the angle of the rear flank surfaces of the auxiliary threads is in the range of 20±3 degrees.

2. A coupling method using a general-purpose tapping screw including a two-line screw structure having a cylindrical body, and main threads and auxiliary threads formed on an outer circumferential surface of the body, in which an outer diameter of the auxiliary threads is 92% to 97% an outer diameter of the main threads, an angle of front flank surfaces of the main threads and the auxiliary threads is in the range of 12±3 degrees, an angle of rear flank surfaces of the main threads is in the range of 25±3 degrees, an angle of rear flank surfaces of the auxiliary threads is in the range of 20±3 degrees, and a first pitch from the main thread to the auxiliary thread and a second pitch from the auxiliary thread to the next main thread have a difference of 10~20%, the method comprising:
   forming a coupling hole in the range of 75~85% of an outer diameter of the main threads in an object made of an injection-molded synthetic resin; and
   coupling the general-purpose tapping screw to the coupling hole.

3. A coupling method using a general-purpose tapping screw including a two-line screw structure having a cylindrical body, and main threads and auxiliary threads formed on an outer circumferential surface of the body, in which an outer diameter of the auxiliary threads is 92% to 97% of an outer diameter of the main threads, an angle of front flank surfaces of the main threads and the auxiliary threads is in the range of 12±3 degrees, an angle of rear flank surfaces of the main threads is in the range of 25±3 degrees, an angle of rear flank surfaces of the auxiliary threads is in the range of 20±3 degrees, and a first pitch from the main thread to the auxiliary thread and a second pitch from the auxiliary thread to the next main thread have a difference of 10~20%, the method comprising:
   forming a coupling hole in the range of 85~95% of an outer diameter of the main threads in an object made of a metal; and
   coupling the general-purpose tapping screw to the coupling hole.

4. The coupling method according to claim 2, further comprising: coating a lubricant on a surface of the general-purpose tapping screw before coupling the general-purpose tapping screw.

5. The coupling method according to claim 3, further comprising: coating a lubricant on a surface of the general-purpose tapping screw before coupling the general-purpose tapping screw.

* * * * *